United States Patent
Flemming et al.

(10) Patent No.: US 7,386,014 B2
(45) Date of Patent: Jun. 10, 2008

(54) SHARED BACKOFF GENERATION FOR 802.11E COMPLIANT WLAN COMMUNICATION DEVICES

(75) Inventors: Ralf Flemming, Dresden (DE); Andreas Abt, Dresden (DE); Andre Schulze, Dresden (DE); Christian Wiencke, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 420 days.

(21) Appl. No.: 11/106,775

(22) Filed: Apr. 15, 2005

(65) Prior Publication Data

US 2006/0114823 A1 Jun. 1, 2006

(30) Foreign Application Priority Data

Nov. 30, 2004 (DE) ............... 10 2004 057 767

(51) Int. Cl.
*H04J 3/06* (2006.01)
(52) U.S. Cl. ............... 370/503; 370/447; 709/232
(58) Field of Classification Search ............ 370/503, 370/447, 458, 461; 709/232, 224, 230
See application file for complete search history.

(56) References Cited

U.S. PATENT DOCUMENTS

| | | | |
|---|---|---|---|
| 6,731,937 B1 | 5/2004 | Spinner | |
| 6,807,536 B2 | 10/2004 | Achlioptas et al. | |
| 6,879,600 B1 | 4/2005 | Jones et al. | |
| 6,917,606 B2 | 7/2005 | Sashihara | |
| 6,965,942 B1 * | 11/2005 | Young et al. | 709/232 |
| 7,133,422 B2 * | 11/2006 | Liu et al. | 370/503 |
| 2002/0085582 A1 * | 7/2002 | Kim | 370/445 |

FOREIGN PATENT DOCUMENTS

| | | |
|---|---|---|
| EP | 0 125 095 | 5/1984 |
| EP | 0 723 351 | 1/1996 |
| EP | 1 333 620 | 1/2003 |

OTHER PUBLICATIONS

Translation of Official Communication, Application No. 10 2004 057 767.6-31, Sep. 21, 2005.

* cited by examiner

*Primary Examiner*—Edward F. Urban
*Assistant Examiner*—Adeel Haroon
(74) *Attorney, Agent, or Firm*—Meyertons Hood Kivlin Kowert & Goetzel, P.C.

(57) ABSTRACT

A WLAN (Wireless Local Area Network) communication device including a first buffer, a second buffer and a shared backoff generator and corresponding methods and integrated circuit chips provided. The first buffer is for queuing first data packets to be transmitted by the WLAN communication device after a transmission channel has been idle for at least a first backoff time. The second buffer is for queuing second data packets to be transmitted by the WLAN communication device after the transmission channel has been idle for at least a second backoff time. The shared backoff generator is adapted to generate a first and a second backoff start value used to determine the first and second backoff times, respectively. Embodiments may reduce the hardware consumption and thus manufacturing and product costs.

15 Claims, 8 Drawing Sheets

SHARED BACKOFF GENERATION FOR 802.11E COMPLIANT WLAN COMMUNICATION DEVICES

BACKGROUND OF THE INVENTION

1. Field of the Invention

The present invention relates to WLAN (Wireless Local Area Network) communication devices and corresponding methods and integrated circuit chips, and in particular to the backoff generation in such WLAN communication devices.

2. Description of the Related Art

A wireless local area network is a flexible data communication system implemented as an extension to or as an alternative for a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wide band radio frequency technique developed for use in reliable and secure communication systems. The spread spectrum technology is designed to trade off bandwidth efficiency for reliability, integrity and security. Two types of spread spectrum radio systems are frequently used: frequency hopping and direct sequence systems.

The standard defining and governing wireless local area networks that operate in the 2.4 GHz spectrum is the IEEE 802.11 standard. To allow higher data rate transmissions, the standard was extended to 802.11b that allows data rates of 5.5 and 11 Mbps in the 2.4 GHz spectrum. Further extensions exist.

One example of these is the 802.11e extension, also referred to as WME (Wireless Media Extensions), that was designed to address QoS (Quality of Service) issues of the precedent 802.11 versions. For this purpose, the 802.11e specification provides MAC (Medium Access Control) enhancements to meet the QoS requirements of multimedia applications like voice over IP or audio/video streaming.

The previous 802.11 MAC layer had no means of differentiating traffic streams or sources. As a result, no consideration could be made for the service requirements of the traffic on the channel. The 802.11e specification introduces two new MAC modes, EDCF (Enhanced Distributed Coordination Function) and HCF (Hybrid Coordination Function), which support up to eight priority traffic classes (TCs).

Referring now to the figures and in particular to FIG. 1, a WLAN communication device, i.e., a transmitter or transceiver is shown in which a number n of traffic classes 105, 130, 155 is implemented. For each traffic class 105, 130, 155, the WLAN communication device includes a FIFO (First In First Out) storage 110, 135, 160 in which packets to be transmitted are queued. Each traffic class having packets to transmit starts a backoff operation after detecting the channel being idle for an arbitration interframe space (AIFS) which can be chosen individually for each traffic class and provides a deterministic priority mechanism between the traffic classes.

The following backoff operation is quantized into so-called time slots. Also, the AIFS interval is usually indicated as an integer number of time slots. A backoff counter 125, 150, 175 assigned to each traffic class 105, 130, 155 is decreased once every time slot. When the backoff counter value of a traffic class reaches zero, the respective traffic class attempts to transmit a packet out of its queue 110, 135, 160. For the next backoff operation, the backoff counter 125, 150, 175 is then set to a BC (Backoff Counter) start value selected randomly by the backoff generator 120, 145, 170 out of a contention window (CW). If, however, the backoff counter value has not reached zero before the channel becomes busy again, the backoff counter value is frozen and the next backoff operation is started with this value.

The minimum initial value of the contention window, denoted by CWmin, can be selected on a per TC basis. As collisions occur, the contention window is multiplied by a persistence factor (PF) that can be chosen individually for each traffic class 105, 130, 155 in the CW adaptors 115, 140, 165, thus providing a probabilistic priority mechanism between the traffic classes 105, 130, 155. Optionally, a maximum possible value CWmax for the contention window can also be selected individually for the traffic classes 105, 130, 155.

Within the WLAN communication device, the traffic classes have independent transmission queues 110, 135, 160. These behave as virtual stations within the above-mentioned parameters AIFS, CWmin, CWmax, and PF, determining their ability to transmit. If the backoff counter of two or more parallel traffic classes 105, 130, 155 in a single WLAN communication device reach zero at the same time, a packet scheduler 180 inside the WLAN communication device treats the event as a virtual collision without recording every transmission. A transmit opportunity is given to the traffic class 105, 130, 155 with the highest priority of the colliding traffic classes, and the others back off as if a collision on the medium occurred.

As can be seen from FIG. 1, each traffic class 105, 130, 155 has assigned its own backoff generator 120, 145, 170. This causes the conventional architecture to be unnecessarily hardware consuming. Traditional WLAN communication devices therefore often suffer from the problem of increased manufacturing costs. Further, this prior art layout is less suitable for device miniaturization, e.g., when aiming at providing WLAN compatible mobile telephones or PDAs (Personal Digital Assistants).

SUMMARY OF THE INVENTION

An improved backoff generation method and corresponding WLAN communication devices and integrated circuit chips are provided that may overcome the disadvantages of the conventional approaches. Particular embodiments may better allow for being miniaturized. Other embodiments offer the advantage of reduced product and manufacturing costs.

In one embodiment, a WLAN communication device including a first buffer, a second buffer and a shared backoff generator is provided. The first buffer is for queuing first data packets to be transmitted by the WLAN communication device after a transmission channel has been idle for at least a first backoff time. The second buffer is for queuing second data packets to be transmitted by the WLAN communication device after the transmission channel has been idle for at least a second backoff time. The shared backoff generator is adapted to generate a first and a second backoff start value used to determine the first and second backoff times, respectively.

In another embodiment, an integrated circuit chip for performing WLAN communication including a first buffer circuit, a second buffer circuit and a shared backoff generation circuit is provided. The first buffer circuit is for queuing first data packets to be transmitted by the integrated circuit chip after a transmission channel has been idle for at least a first backoff time. The second buffer circuit is for queuing second data packets to be transmitted by the integrated circuit chip after the transmission channel has been idle for at least a second backoff time. The shared backoff generation circuit is adapted to generate a first and a second backoff start value used to determine the first and second backoff times, respectively.

In a further embodiment, a method of operating a WLAN communication device is provided. First data packets to be transmitted by the WLAN communication device after a transmission channel has been idle for at least a first backoff time are queued in a first buffer. Second data packets to be transmitted by the WLAN communication device after the transmission channel has been idle for at least a second backoff time are queued in a second buffer. A shared backoff generator generates a first and a second backoff start value used to determine the first and second backoff times, respectively.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 2:
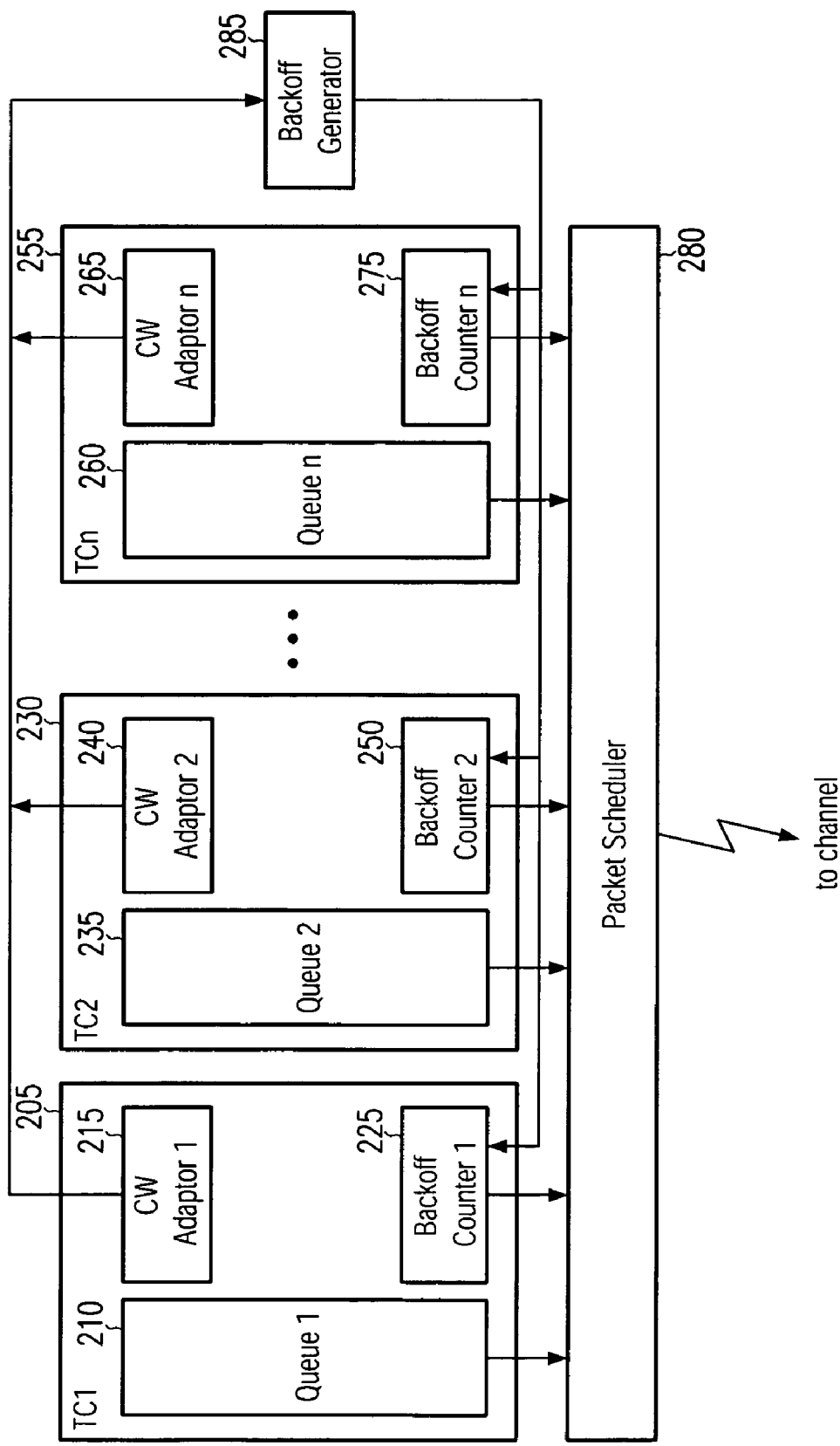
FIG. 2 is a block diagram illustrating components of a WLAN communication device according to an embodiment.

Referring now to FIG. 2, components of a WLAN communication device according to an embodiment are shown. In order to provide 802.11e compliance, a number n of traffic classes 205, 230, 255 are implemented in the depicted WLAN communication device. The number n of traffic classes 205, 230, 255 may be, e.g., 4 or 8 or any other integer. The traffic classes 205, 230, 255 may be completely independent from each other.

Each traffic class 205, 230, 255 may comprise its own queue 210, 235, 260 containing an ordered sequence of packets to be transmitted. The queues 210, 235, 260 may, for example, be realized in the form of FIFO buffers. Each queue 210, 235, 260 may be connected to a packet scheduler 280 for forwarding the packets to the transmission channel.

For backoff operations, each traffic class 205, 230, 255 may comprise a backoff counter 225, 250, 275 and a contention window adaptor 215, 240, 265.

Each backoff counter 225, 250, 275 may be connected to the packet scheduler 280 to inform the packet scheduler 280 whether the respective traffic class 205, 230, 255 has completed its backoff operation, i.e., its backoff counter value has reached zero. In other embodiments, the backoff counters 225, 250, 275 may be connected to intermediate units interfaced between the queues 210, 235, 260 and the packet scheduler 280 that may only forward packets from the queues 210, 235, 260 to the packet scheduler 280 if the respective backoff counter value has reached zero.

The contention window adaptors 215, 240, 265 may allow for setting and/or adapting individual contention windows for each of the traffic classes 205, 230, 255.

Figure 1:
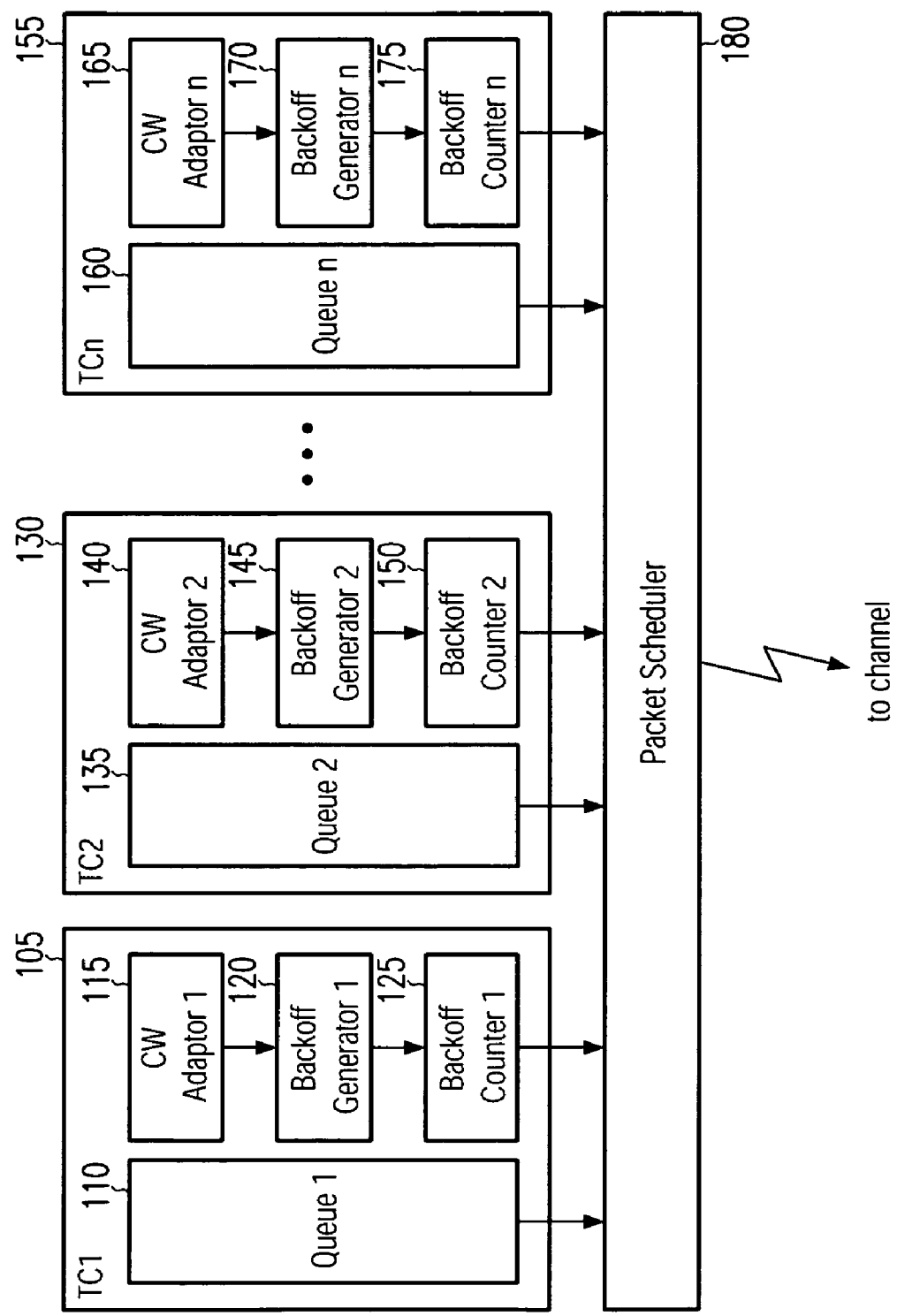
FIG. 1 is a block diagram illustrating components of a WLAN communication device according to prior art.

When comparing the WLAN communication device of FIG. 2 to the WLAN communication device depicted in FIG. 1, the backoff counters 225, 250, 275 of the present embodiment are connected to one single backoff generator 285 shared by all the traffic classes 205, 230, 255 instead of comprising individual backoff generators 120, 145, 170. In other embodiments, backoff counters 225, 250, 275 of some of the traffic classes 205, 230, 255 may be connected to the shared backoff generator 285 while others of the traffic classes 205, 230, 255 may comprise their own backoff generators. In further embodiments, the WLAN communication device may comprise more than one backoff generator 285, each shared by some of the traffic classes 205, 230, 255.

The shared backoff generator 285 may be coupled to the contention window adaptors 215, 240, 265 and to the backoff counters 225, 250, 275 of each traffic class 205, 230, 255 connected to the backoff generator 285. In one embodiment, the contention window adaptors 215, 240, 265 may be connected in parallel to the backoff generator 285. In this embodiment, the contention window adaptors 215, 240 265 may provide the backoff generator 285 with the currently valid contention windows for the traffic classes 205, 230, 255 together with an identifier indicating the traffic class 205, 230, 255 to which the respective contention window adaptor 215, 240, 265 belongs. Alternatively, the backoff generator 285 may request the contention windows for each of the traffic classes 205, 230, 255 individually from the respective contention window adaptor 215, 240, 265. In still other embodiments, the backoff generator 285 may have multiple inputs, each connected to one of the contention window adaptors 215, 240, 265.

Further, the backoff generator 285 may be connected to each of the backoff counters 225, 250, 275 for supplying the backoff counters 225, 250, 275 with BC start values for the backoff operation. According to the present embodiment, the backoff counters 225, 250, 275 are connected in parallel to the backoff generator 285, and the backoff generator 285 delivers each of the BC start values together with an identifier indicating one of the backoff counters 225, 250, 275 as the target backoff counter. Alternatively, the backoff generator 285 could have a plurality of BC start value outputs, each connected to one of the backoff counters 225, 250, 275.

Figure 3:
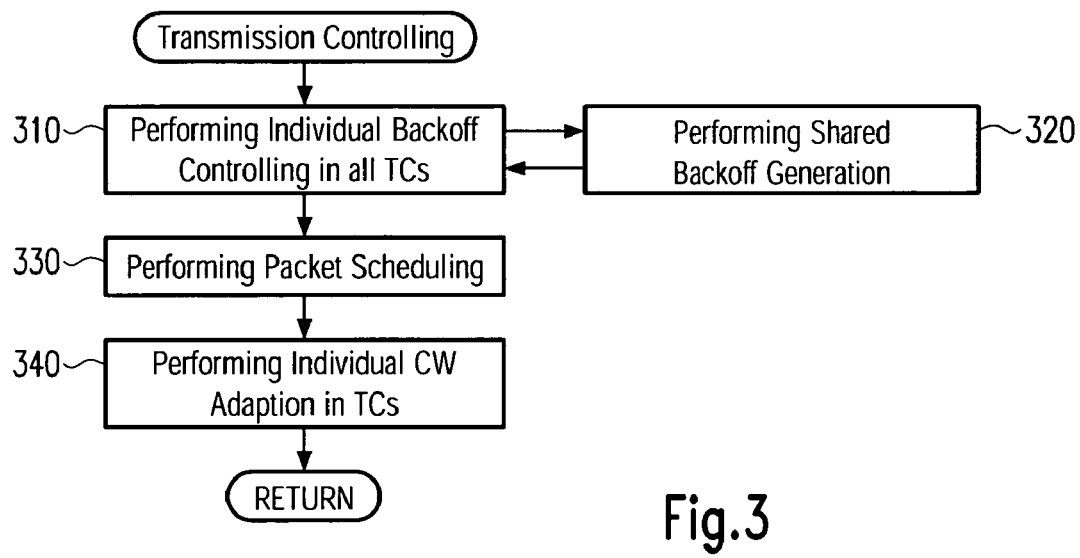
FIG. 3 is a flow diagram illustrating a transmission controlling process according to an embodiment.

Turning now to FIG. 3, a flow chart illustrating the transmission controlling that may be performed by a WLAN communication device according to an embodiment is shown. The WLAN communication device may comprise the components described above with respect to FIG. 2.

In step 310, all of the traffic classes 205, 230, 255 may perform an individual backoff controlling operation in parallel. The backoff generator 285 may perform a shared backoff generation in step 320. According to the present embodiment, the individual backoff controlling 310 and the shared backoff generation 320 are parallel interleaved processes as will be explained in more detail below. Upon accomplishment of the individual backoff controlling 310 in the traffic classes 205, 230, 255, packet scheduling may be performed by the packet scheduler 280 in step 330. Then the contention window adaptors 215, 240, 265 may perform a contention window adaptation process 340 individually in the traffic classes 205, 230, 255.

Figure 4:
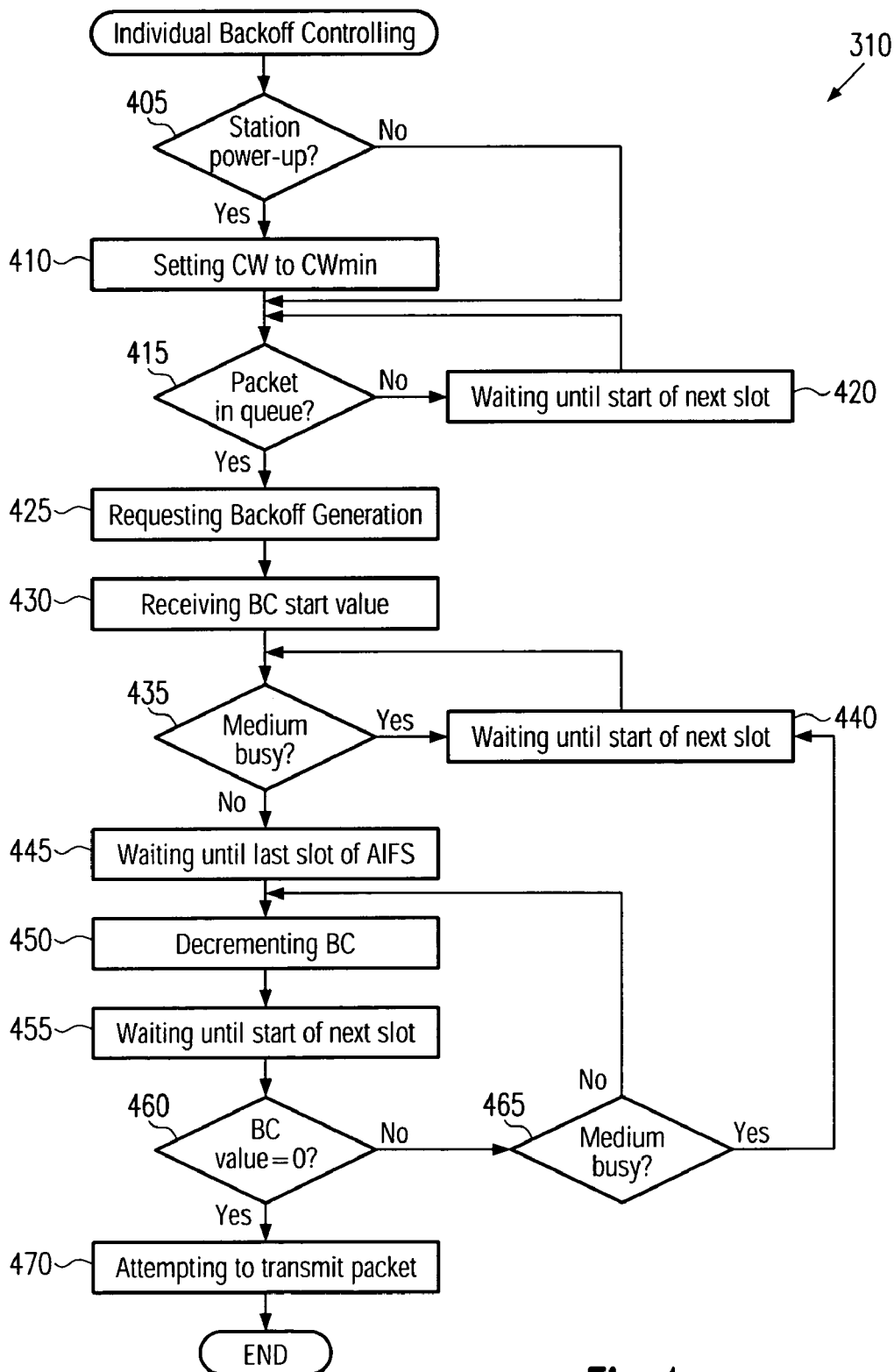
FIG. 4 is a flow diagram illustrating the individual backoff controlling step of FIG. 3 according to an embodiment.

The steps of the individual backoff controlling 310 according to the present embodiment are depicted in FIG. 4. The shared backoff generation 320 will be explained in more detail with respect to FIGS. 5A, 5B, 5C, 6 and 7. Further details of the packet scheduling 330 and the individual contention window adaptation 340 will be given with regard to FIGS. 8 and 9, respectively.

Referring now to FIG. 4, the backoff controlling 310 performed in each of the traffic classes 205, 230, 255 in parallel is shown. In step 405 it may be queried whether the WLAN communication device, also referred to as station, is powered up, i.e., whether the actual transmission controlling process is an initial transmission controlling process. If this is the case, the contention window may be set to the minimum allowed value CWmin in step 410. It is to be noted that the CWmin value may be different for each of the traffic classes 205, 230, 255 and may be provided by a WLAN access point. If the actual transmission controlling process is not the initial one, step 410 may be skipped.

In step 415, it may be queried whether there is a packet to be transmitted in the queue 210, 235, 260. If this is not the case, the respective traffic class 205, 230, 255 may wait until the start of the next time slot in step 420 and then repeat the query 415. Once there is a packet to be transmitted, the traffic class 205, 230, 255 may request the shared backoff generator 285 to provide a BC start value. This may be accomplished, e.g., by sending the actual contention window from the contention window adaptor 215, 240, 265 to the backoff generator 285 or by sending a dedicated backoff generation request thereto. At this point, the backoff generation 320 may be interleaved. The BC start value generated in this process may be sent from the backoff generator 285 to the requesting traffic class 205, 230, 255 and received in step 430.

Next, in step 435 it may be determined whether the transmission medium, i.e., the channel on which the WLAN communication device intends to transmit the packet, is busy. If so, the traffic class 205, 230, 255 may wait until the start of the next time slot in step 440 and then repeat the query 435. If, however, it has been determined in step 435 that the transmission medium is idle, the traffic class 205, 230, 255 may wait until the last slot of its AIFS interval in step 445 and then decrement the backoff counter value by one in step 450. In other embodiments, the traffic class 205, 230, 255 may wait until the end of the AIFS interval in step 445 before decreasing the backoff counter value in step 450.

It is to be noted that the AIFS interval may be different for some or each of the traffic classes 205, 230, 255 and may be set by the access point.

After having waited until the start of the next time slot in step 455, the traffic class 205, 230, 255 may determine whether the backoff counter value has reached zero in step 460. If this is not yet the case, it may be determined in step 465 whether the transmission medium is still idle. If so, the traffic class 205, 230, 255 may return to step 450 for decrementing the backoff counter value again. If, however, step 465 yields that the transmission medium has become busy again, the individual backoff controlling scheme may return to step 440 to wait until the start of the next time slot and then re-query whether the medium is busy in step 435.

If it is determined in step 460 that the backoff counter value has reached zero, the traffic class 205, 230, 255 may attempt to transmit one packet out of its queue 210, 235, 260. According to the present embodiment, the traffic class 205, 230, 255 announces in step 470 to the packet scheduler 280 that it now wants to transmit a packet. In other embodiments, the packet scheduler 280 may be informed by the backoff counter 225, 250, 275 that the backoff counter value has reached zero and may then request the respective queue 210, 235, 260 to forward the packet to be transmitted through the packet scheduler 280 to the transmission channel.

Turning now to FIGS. 5A to 7, the shared backoff generation 320 of the present embodiment will be described in more detail.

As has been explained above with respect to FIG. 2, the backoff generator 285 may be shared by a number n of traffic classes 205, 230, 255. Therefore, the backoff generator 285 may need to generate up to n BC start values, one for each of the traffic classes 205, 230, 255 requesting backoff generation in step 425, within one time slot. In the present case, the BC start value is generated as a random integer out of the interval [1; CW+1]. In other embodiments, the interval [0; CW] or any other interval based on the contention window may be used for the backoff generation.

The time needed by the backoff generator 285 for generating one random BC start value may be referred to as a BC clock cycle. According to the present embodiment, the BC clock cycle is about one microsecond and thus much shorter than a typical EDCF time slot.

Figure 5A:
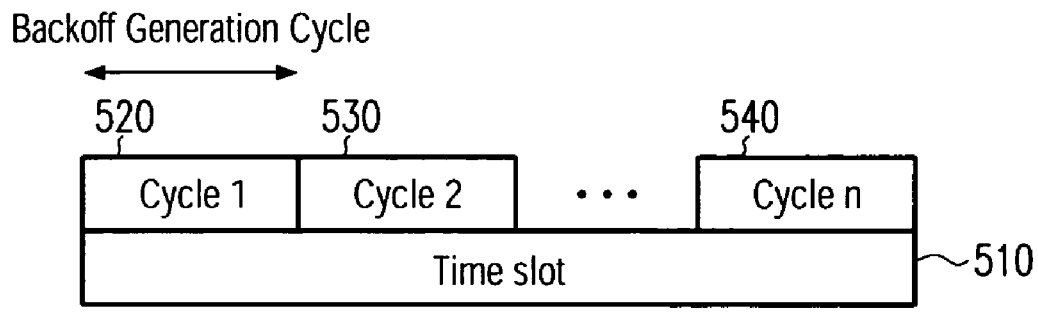
FIG. 5A is a block diagram illustrating the partitioning of a time slot into backoff generation cycles according to an embodiment.

In FIG. 5A a time slot 510 is shown, which according to the present embodiment is divided into backoff generation cycles 520, 530, 540. The number of backoff generation cycles 520, 530, 540 may correspond to the number n of traffic classes 205, 230, 255 implemented in the WLAN communication device. Each backoff generation cycle 520, 530, 540 may be assigned to one of the traffic classes 205, 230, 255. During one cycle 520, 530, 540, the backoff generator 285 may generate a BC start value for the traffic class 205, 230, 255 to which the backoff generation cycle 520, 530, 540 is assigned. This will be explained in more detail with respect to FIG. 6.

Alternatively, the backoff generation cycles 520, 530, 540 may not be assigned to a particular one of the traffic classes 205, 230, 255. The backoff generator 285 may then produce BC start values according to the backoff generation scheme depicted in FIG. 7.

According to the present embodiment, the backoff generation cycles 520, 530, 540 are of equal length. In other embodiments, the backoff generation cycles 520, 530, 540 may have different lengths. Further, the backoff generation cycles 520, 530, 540 may be equal to or longer than the above introduced BC clock cycle. For example, the backoff generation cycles 520, 530, 540 may correspond to multiple integers of the BC clock cycle.

Figure 5B:
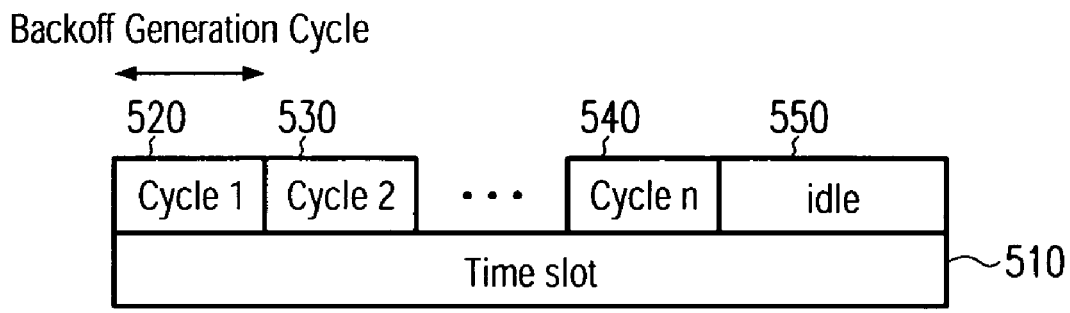
FIG. 5B is a block diagram illustrating the partitioning of a time slot into backoff generation cycles according to another embodiment.
Figure 5C:
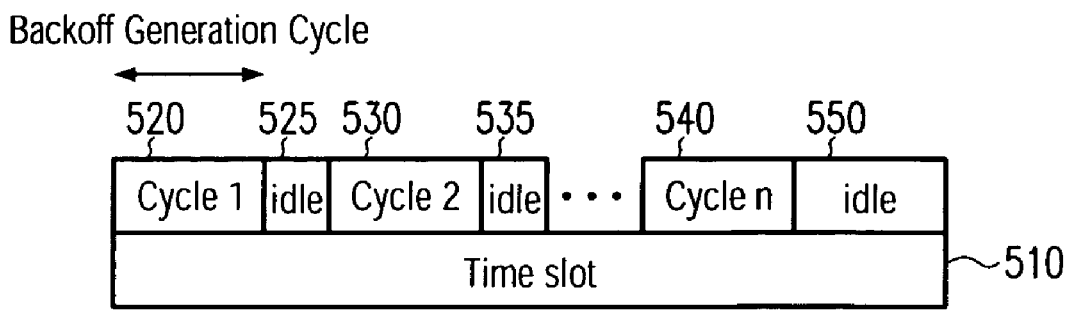
FIG. 5C is a block diagram illustrating the partitioning of a time slot into backoff generation cycles according to a further embodiment.

Whereas FIG. 5A shows a backoff generation time scheme in which the backoff generation cycles 520, 530, 540 sum up to the time slot 510, FIGS. 5B and 5C show time schemes of other embodiments where the sum of the lengths of the backoff generation cycles 520, 530, 540 is less than the length of the time slot 510. In the embodiment of FIG. 5B, the backoff generation cycles 520, 530, 540 are followed by an interval 550 during which the backoff generator 285 is idle. FIG. 5C shows the backoff generation time scheme of an embodiment in which the backoff generation cycles 520, 530, 540 are interleaved with idle intervals 525, 535, 550 of the backoff generator 285.

Figure 6:
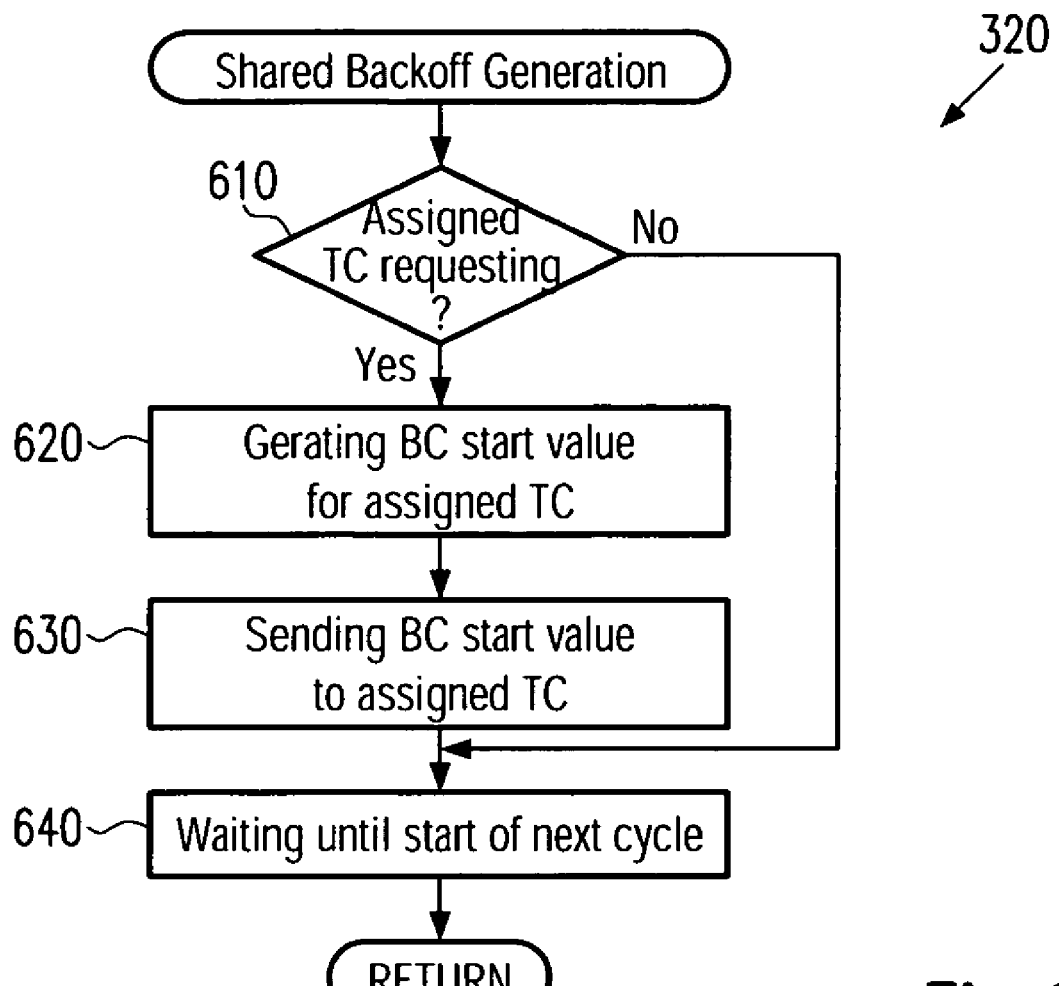
FIG. 6 is a flow diagram illustrating the shared backoff generation step of FIG. 3 according to an embodiment.

Turning now to FIG. 6, a flow diagram of the shared backoff generation 320 is shown according to an embodiment in which each of the backoff generation cycles 520, 530, 540 is assigned to an individual one of the traffic classes 205, 230, 255.

In step 610, the backoff generator 285 may determine whether the traffic class 205, 230, 255 to which the current backoff generation cycle 520, 530, 540 is assigned is requesting backoff generation, i.e., performing step 425 of FIG. 4. If this is not the case, the backoff generator 285 may wait until the start of the next backoff generation cycle 520, 530, 540 in step 640 and then repeat the shared backoff generation scheme 320.

If step 610 yields that the traffic class 205, 230, 255 to which the current backoff generation cycle 520, 530, 540 is assigned is requesting backoff generation, a BC start value may be generated for the assigned traffic class 205, 230, 255 in step 620. Thereby, the backoff generator 285 may generate a random number out of an interval that is based on the contention window of the assigned traffic class, e.g., [1; CW+1] as explained above. Then in step 630, the backoff generator 285 may send the generated BC start value to the assigned traffic class 205, 230, 255 and subsequently wait until the start of the next backoff generation cycle 520, 530, 550 in step 640.

Figure 7:
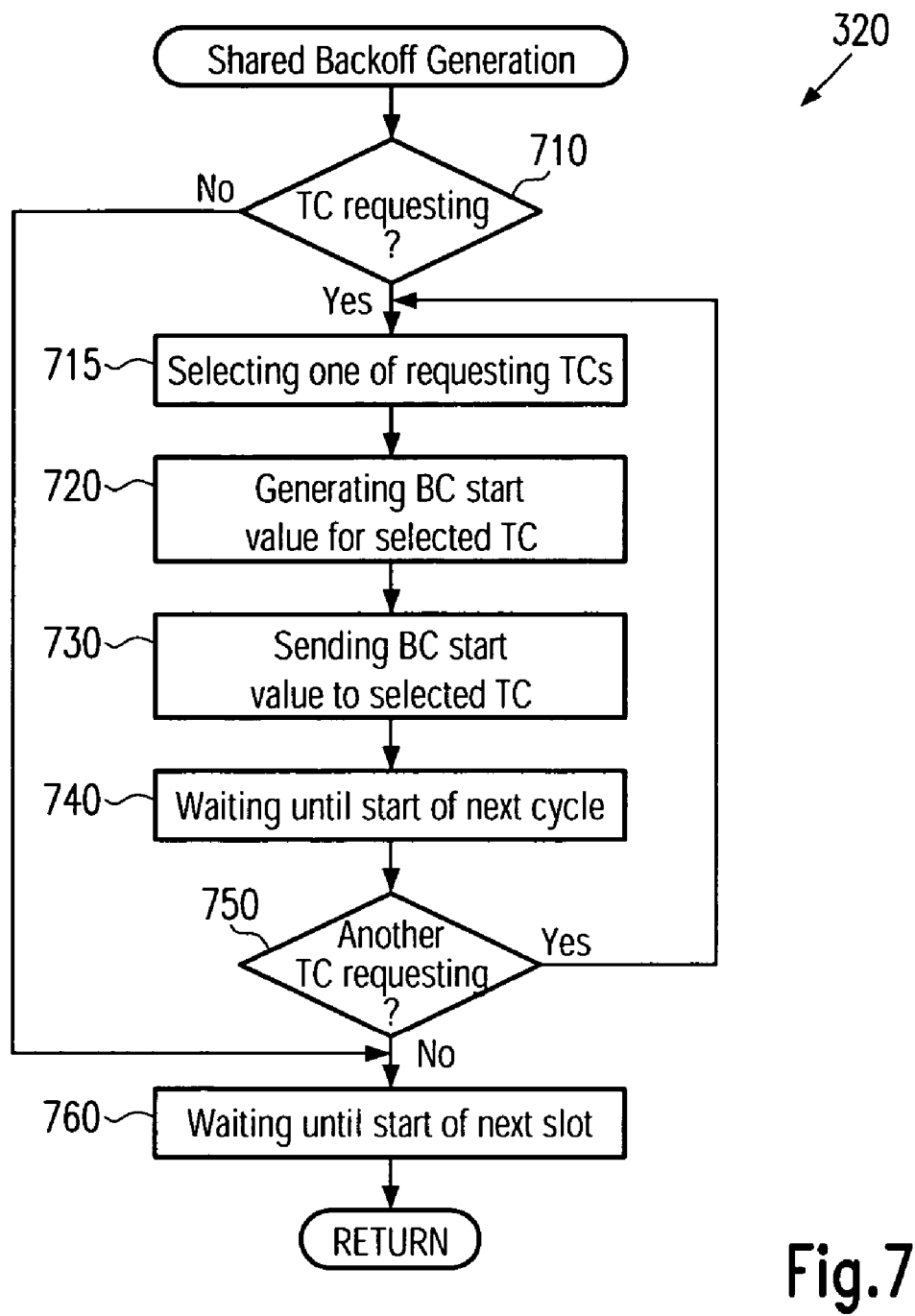
FIG. 7 is a flow diagram illustrating the shared backoff generation step of FIG. 3 according to another embodiment.

In another embodiment in which the individual backoff generation cycles 520, 530, 540 are not assigned to specific ones of the traffic classes 205, 230, 255, the backoff generator 285 may perform the shared backoff generation 320 according to the method illustrated in the flow diagram of FIG. 7.

In this case, it may be determined in step 710 whether there are one or more traffic classes 205, 230, 255 of the WLAN station requesting backoff generation, e.g., by performing step 425 explained with respect to FIG. 4. If none of the traffic classes 205, 230, 255 are requesting backoff generation, the backoff generator 285 may proceed to step 760 for waiting until the start of the next time slot and then repeat the depicted shared backoff generation scheme.

In case there are one or more traffic classes 205, 230, 255 requesting backoff generation, the backoff generator 285 may select one of the requesting traffic classes 205, 230, 255 in step 715. If only one traffic class 205, 230, 255 is requesting backoff generation, this traffic class 205, 230, 255 may be selected in step 715. Then in step 720, a BC start value may be generated for the selected traffic class 205, 230, 255 based on the contention window of the selected traffic class 205, 230, 255 in step 720. Subsequently in step 730, the generated BC start value may be sent to the selected traffic class 205, 230, 255.

In step 740, the backoff generator 285 may wait until the start of the next backoff generation cycle 520, 530, 540 and then determine in step 750 whether there are still traffic classes 205, 230, 255 requesting backoff generation for which a BC start value has not yet been generated during the actual time slot 510. If so, the backoff generator 285 may repeat step 715 to step 750. Once step 750 yields that there are no more requesting traffic classes 205, 230, 255 to be served, i.e., that BC start values have been generated for all traffic classes requesting backoff generation in the current time slot 510, the backoff generator 285 may wait in step 760 until the start of the next time slot 510 and then return to step 710.

Figure 8:
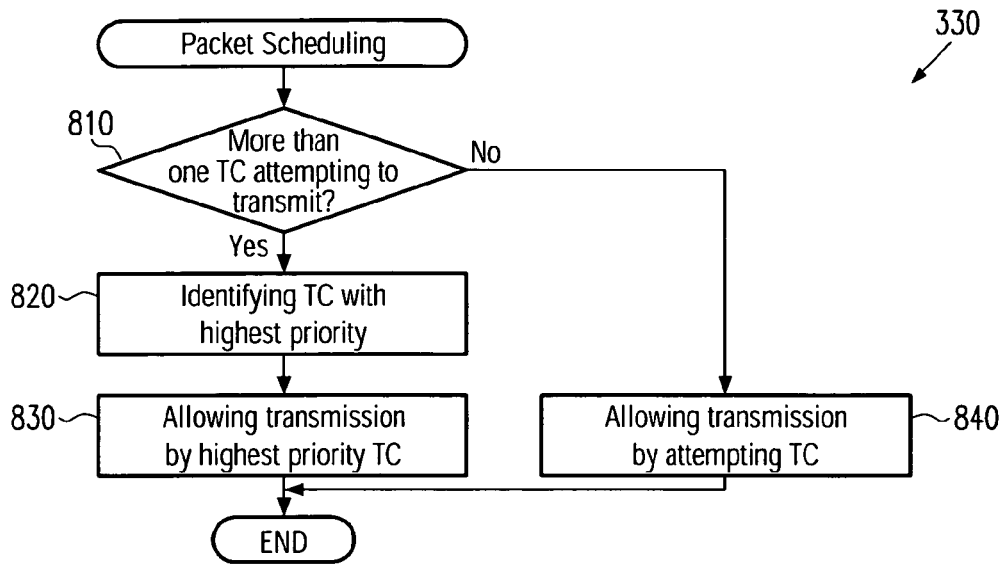
FIG. 8 is a flow diagram illustrating the packet scheduling step of FIG. 3 according to an embodiment.
Figure 9:
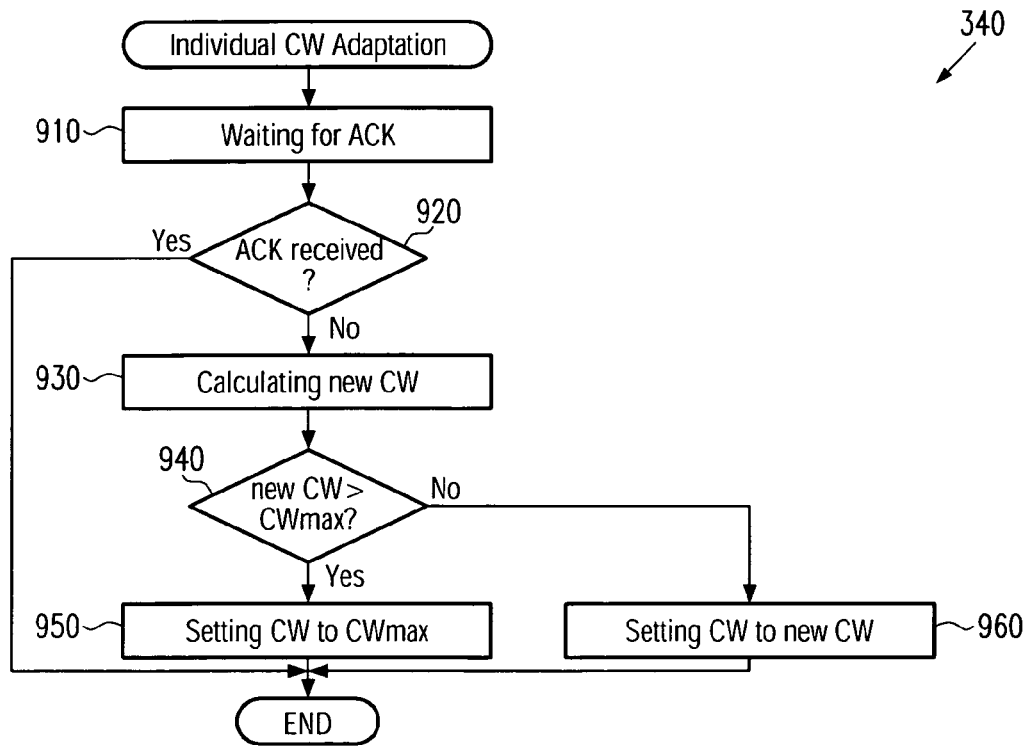
FIG. 9 is a flow diagram illustrating the individual contention window adaptation step of FIG. 3 according to an embodiment.

Turning now to FIG. 8, the packet scheduling 330 performed by the packet scheduler 280 according to an embodiment is shown. In step 810, the packet scheduler 280 may determine whether there is more than one traffic class 205, 230, 255 attempting to transmit a packet, i.e., performing step 470 explained above with respect to FIG. 4. In embodiments where the backoff counters 225, 250, 275 are connected to the packet scheduler 280, this may comprise determining whether more than one backoff counter 225, 250, 275 announces that its backoff counter value has reached zero. In other embodiments, e.g., where the backoff counters 225, 250, 275 each are connected to an intermediate unit interposed between the queues 210, 235, 260 and the packet scheduler 280 as indicated above with respect to FIG. 2, step 810 may include determining whether packets from more than one queue 210, 235, 260 are forwarded to the packet scheduler 280.

If step 810 yields that there is a plurality of traffic classes 205, 230, 255 attempting to transmit a packet, the packet scheduler 280 may identify the traffic class 205, 230, 255 having the highest priority in step 820 and may then allow the traffic class 205, 230, 255 of the highest priority to transmit its packet, e.g., by forwarding the packet of the highest priority traffic class 205, 230, 255 to the transmission channel. In case it is determined in step 810 that only one or none of the traffic classes 205, 230, 255 attempts to transmit a packet, the packet scheduler 280 may allow in step 840 the attempting traffic class 205, 230, 255, if any, to transmit its packet over the transmission channel.

Once a traffic class 205, 230, 255 has attempted to transmit a packet in step 470 and packet scheduling 330 has been performed, the individual contention window adaptation process 340 may be performed by those traffic classes 205, 230, 255 having made an attempt 470 to transmit a packet. This will now be explained in more detail with respect to FIG. 9.

In step 910, the traffic class 205, 230, 255 may be waiting for an acknowledgement (ACK) indicating that its packet has been received at its intended destination. In step 920 it may be determined whether a corresponding ACK packet has been received. There may be a predetermined ACK time during which the ACK packet needs to be received by the traffic class 205, 230, 255.

If no ACK packet is received within this ACK time, it may be determined in step 920 that no ACK packet has been received. The contention window adaptor 215, 240, 265 of the traffic class 205, 230, 255 performing the individual contention window adaptation 340 may then calculate a new contention window value in step 930. This may be accomplished, e.g., by doubling the contention window or multiplying the contention window by a persistence factor (PF) which may be different for the individual traffic classes 205, 230, 255. Alternatively, the new contention window may be calculated in step 930 as new CW=((CW+1)×PF)−1. In other embodiments, other algorithms may be applied for calculating the new contention window in step 930.

Once a new contention window has been calculated, the contention window adaptor 215, 240, 265 may determine in step 940 whether the new contention window exceeds a maximum allowed value CWmax. If this is not the case, step 960 may be performed to set the contention window to the new contention window value calculated in step 930. Otherwise, the contention window may be set to the CWmax value in step 950. In other embodiments, the individual contention window adaptation scheme 340 may return to step 930 if it is determined in step 940 that the new contention window exceeds the maximum allowed value CWmax. The CWmax value may be different for the different traffic classes 205, 230, 255 and may be provided by the WLAN access point.

As apparent from the above description of embodiments, a resource sharing technique for QoS random number generation is provided which may allow for reducing manufacturing and hardware costs. A set of queues 205, 230, 255 may be defined according to the 802.11e/WME specification, each queue 205, 230, 255 having its own channel access function. Each channel access function may in turn include a set of primitive polynoms used for backoff generation 320.

To reduce hardware costs, the backoff generation 320 may be shared between all queues 205, 230, 255 by defining time intervals 520, 530, 540 equal to the number n of queues 205, 230, 255. For backoff updates of a queue 205, 230, 255, only the time interval 520, 530, 540 may be used which is assigned to this queue 205, 230, 255.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) communication device comprising:
    a first buffer for queuing first data packets to be transmitted by said WLAN communication device after a transmission channel has been idle for at least a first backoff time;
    a second buffer for queuing second data packets to be transmitted by said WLAN communication device after the transmission channel has been idle for at least a second backoff time; and
    a shared hardware backoff generator adapted to generate a first and a second backoff start value used to determine said first and second backoff times, respectively; and
    a first and a second backoff counter adapted to determine the end of said first and second backoff times, respectively, by decrementing once in a predetermined time slot a first and a second backoff counter value, respectively, starting at said first and second backoff start values, respectively,
    wherein said shared hardware backoff generator is connected to each of said first and second backoff counters to provide said first and second backoff start values to said first and second backoff counters, respectively;
    wherein said predetermined time slot is divided into a first and a second backoff generation cycle assigned to said first and second buffers, respectively; and
    wherein said shared hardware backoff generator is further adapted to:
        determine whether generation of a backoff start value for a buffer is requested to which a current backoff generation cycle is assigned;
        generate said first backoff start value only if the current backoff generation cycle is said first backoff generation cycle and generation of a backoff start value for said first buffer is requested; and
        generate said second backoff start value only if the current backoff generation cycle is said second backoff generation cycle and generation of a backoff start value for said second buffer is requested.

2. The WLAN communication device of claim 1, further comprising a first and a second contention window adaptor adapted to provide a first and a second contention window, respectively, each defining a maximum value for the first and second backoff start values, respectively.

3. The WLAN communication device of claim 2, wherein said shared hardware backoff generator is connected to each of said first and second contention window adaptors to receive said first and second contention windows, respectively.

4. The WLAN communication device of claim 3, wherein said shared hardware backoff generator is further adapted to generate said first and second backoff start values as random numbers out of intervals defined by said first and second contention windows, respectively.

5. The WLAN communication device of claim 3, wherein the sum of the lengths of said first and second backoff generation cycles is less than the length of said predetermined time slot.

6. An integrated circuit chip for performing WLAN (Wireless Local Area Network) communication, comprising:
    a first buffer circuit for queuing first data packets to be transmitted by said integrated circuit chip after a transmission channel has been idle for at least a first backoff time;
    a second buffer circuit for queuing second data packets to be transmitted by said integrated circuit chip after the transmission channel has been idle for at least a second backoff time; and
    a shared backoff generation circuit adapted to generate a first and a second backoff start value used to determine said first and second backoff times, respectively; and
    a first and a second backoff counting circuit adapted to determine the end of said first and second backoff times, respectively, by decrementing once in a predetermined time slot a first and a second backoff counter value. respectively, starting at said first and second backoff start values, respectively,
    wherein said shared backoff generation circuit is connected to each of said first and second backoff counting circuits to provide said first and second backoff start values to said first and second backoff counting circuits, respectively,
    wherein said predetermined time slot is dividied into a first and a second backoff generation cycle assigned to said first and second buffer circuits, respectively, and
    wherein said shared backoff generation circuit is further adapted to:

determine whether generation of a backoff start value for a buffer circuit is requested to which a current backoff generation cycle is assigned;

generate said first backoff start value only if the current backoff generation cycle is said first backoff generation cycle and generation of a backoff start value for said first buffer circuit is requested; and generate said second backoff start value only if the current backoff generation cycle is said second backoff generation cycle and generation of a backoff start value for said second buffer circuit is requested.

7. The integrated circuit chip of claim 6, further comprising a first and a second contention window adaptation circuit adapted to provide a first and a second contention window, respectively, each defining a maximum value for the first and second backoff start values, respectively.

8. The integrated circuit chip of claim 7, wherein said shared backoff generation circuit is connected to each of said first and second contention window adaptation circuits to receive said first and second contention windows, respectively.

9. The integrated circuit chip of claim 8, wherein said shared backoff generation circuit is further adapted to generate said first and second backoff start values as random numbers out of intervals defined by said first and second contention windows, respectively.

10. The integrated circuit chip of claim 6, wherein the sum of the lengths of said first and second backoff generation cycles being less than the length of said predetermined time slot.

11. A method of operating a WLAN (Wireless Local Area Network) communication device, comprising:

queuing first data packets to be transmitted by said WLAN communication device after a transmission channel has been idle for at least a first backoff time in a first buffer;

queuing second data packets to be transmitted by said WLAN communication device after the transmission channel has been idle for at least a second backoff time in a second buffer; and generating a first and a second backoff start value used to determine said first and second backoff times, respectively, by a shared backoff hardware generator;

determining, by a first and a second backoff counter, the end of said first and second backoff times, respectively, by decrementing once in a predetermined time slot a first and a second backoff counter value, respectively, starting at said first and second backoff start values, respectively, and providing said first and second backoff start values to said first and second backoff counter, respectively, by said shared hardware backoff generator connected to said first and second backoff counters, wherein said predetermined time slot is dividied into a first and a second backoff generation cycle assigned to said first and second buffers, respectively, and wherein the method further comprises:

determining by said shared hardware backoff generator whether generation of a backoff start value for a buffer is requested to which a current backoff generation cycle is assigned;

generating said first backoff start value only if the current backoff generation cycle is said first backoff generation cycle and generation of a backoff start value for said first buffer is requested; and generating said second backoff start value only if the current backoff generation cycle is said second backoff generation cycle and generation of a backoff start value for said second buffer is requested.

12. The method of claim 11, further comprising providing a first and a second contention window each defining a maximum value for the first and second backoff start values, respectively, by a first and a second contention window adaptor, respectively.

13. The method of claim 12, further comprising receiving said first and second contention windows by said shared hardware backoff generator connected to said first and second contention window adaptors.

14. The method of claim 13, wherein generating said first and second backoff start values comprises generating said first and second backoff start values as random numbers out of intervals defined by said first and second contention windows, respectively.

15. The method of claim 11, wherein generating said first and second backoff start values further comprises generating said first and second backoff start values in a first and second backoff generation cycle, respectively, the sum of the lengths of said first and second backoff generation cycles being less than the length of said predetermined time slot.

* * * * *